United States Patent [19]
Siwiak et al.

[11] Patent Number: 5,410,749
[45] Date of Patent: Apr. 25, 1995

[54] RADIO COMMUNICATION DEVICE HAVING A MICROSTRIP ANTENNA WITH INTEGRAL RECEIVER SYSTEMS

[75] Inventors: Kazimierz Siwiak; William J. Kuznicki, both of Coral Springs, Fla.

[73] Assignee: Motorola, Inc., Schaumburg, Ill.

[21] Appl. No.: 988,091

[22] Filed: Dec. 9, 1992

[51] Int. Cl.⁶ ............................................... H04B 1/18
[52] U.S. Cl. ............................ 455/280; 343/700 MS; 340/825.44; 455/228; 455/351; 455/133
[58] Field of Search ............... 343/700 MS, 702, 718; 340/825.44; 455/280, 283, 38.1, 38.4, 228, 90, 347, 351, 272, 278.1, 276.1, 131, 132, 133, 135, 136, 137, 138, 139, 83

[56] References Cited

U.S. PATENT DOCUMENTS

| | | | |
|---|---|---|---|
| 3,946,397 | 3/1976 | Irwin | 343/744 |
| 4,742,568 | 5/1988 | Furuya | 455/277 |
| 4,817,196 | 3/1989 | Macnak et al. | 455/193 |
| 4,829,591 | 5/1989 | Hashimoto et al. | 455/89 |
| 4,853,972 | 8/1989 | Ueda et al. | 455/83 |
| 4,884,252 | 11/1989 | Teodoridis et al. | 368/10 |
| 4,914,714 | 4/1990 | Tamura | 455/78 |
| 4,924,237 | 5/1990 | Honda et al. | 343/702 |
| 4,952,929 | 8/1990 | DeLuca et al. | 340/825.44 |
| 5,007,105 | 4/1991 | Kudoh et al. | 455/344 |
| 5,023,621 | 6/1991 | Ushiyama et al. | 343/702 |
| 5,124,733 | 6/1992 | Haneishi | 343/700 |
| 5,144,296 | 9/1992 | DeLuca et al. | 340/825.44 |
| 5,201,065 | 4/1993 | Niehenke | 455/83 |

FOREIGN PATENT DOCUMENTS

0100639A2 2/1984 European Pat. Off. .
9013951 11/1990 WIPO .

OTHER PUBLICATIONS

Motorola "The Wrist Watch Pager" Series Numeric Display Pagers 138-173 MHz Service Manual 6881011B10-0, 1990 by Motorola, Inc.

Primary Examiner—Edward F. Urban
Assistant Examiner—Philip J. Sobutka
Attorney, Agent, or Firm—R. Louis Breeden

[57] ABSTRACT

A radio communication device (600) comprises a microstrip antenna (300) having a planar antenna element (302) and a ground plane (314) coupled to the planar antenna element (302). The microstrip antenna further comprises a dielectric material (304) positioned between the planar antenna element (302) and the ground plane (314), and a primary receiver element (325, 326, 328) mechanically coupled to the ground plane (314). The microstrip antenna (300) further comprises a feeder (308, 310) electrically coupled between the planar antenna element (302) and the primary receiver element (325, 326, 328) for feeding an intercepted radio signal therebetween for down conversion by the primary receiver element (325, 326, 328). The radio communication device (600) also comprises a secondary receiver element (828) coupled to the primary receiver element (325, 326, 328) for demodulating the intercepted radio signal after down conversion by the primary receiver element (325, 326, 328).

21 Claims, 8 Drawing Sheets

RADIO COMMUNICATION DEVICE HAVING A MICROSTRIP ANTENNA WITH INTEGRAL RECEIVER SYSTEMS

FIELD OF THE INVENTION

This invention relates in general to radio communication devices, and more specifically to a radio communication device including a microstrip antenna having integrated receiver circuitry.

BACKGROUND OF THE INVENTION

Portable radio communication devices are well-known. It is also well-known that there has been a long-continued trend toward micro-miniaturization of portable radio communication devices. This trend is especially important in devices that are designed to be worn on a user's body, such as a wrist-worn selective call receiver.

A problem that must be overcome is that micro-miniature housings required for micro-miniature radio communication devices leave little space for a required antenna. Wrist-worn receivers that attach to the user by a partially conductive wrist band and operate in a VHF radio frequency band near 150 MHz have typically used tiny ferrite core antennas in combination with the wrist band itself as a loop antenna. While this technique has performed well for the VHF band, it is not well suited for the much higher UHF and 900 MHz bands in use today and even higher frequencies planned for the future.

A further problem arises from a need to maximize antenna sensitivity while in a severe multipath fading environment. This problem is particularly acute in satellite-based systems, in which transmitter-to-receiver distance is large and transmitter power is limited. In addition, satellite-based systems utilizing low-Earth-orbit satellites (as opposed to geo-stationary satellites) exhibit a slowly changing multipath fading environment caused by earth reflection in conjunction with changing satellite azimuth as a result of orbital movement of the satellite.

Thus, what is needed is a micro-miniature antenna that performs well at UHF and higher frequencies. The antenna must be able to fit comfortably within a wrist watch-size housing. The shape of the antenna ideally will be able to conform to the geometry of the housing rather than forcing the housing to conform to a shape required by the antenna. Furthermore, the antenna must perform well in the slowly changing multipath fading environment present in low-Earth-orbit satellite-based systems.

SUMMARY OF THE INVENTION

One aspect of the present invention is a radio communication device having a microstrip antenna comprising a planar antenna element having first and second major surfaces, and a ground plane coupled to the planar antenna element and having first and second major surfaces substantially parallel to the first and second major surfaces of the planar antenna element. The microstrip antenna further comprises a dielectric material positioned between the second major surface of the planar antenna element and the first major surface of the ground plane for electrically insulating the planar antenna element from the ground plane, and a primary receiver element mechanically coupled to the second major surface of the ground plane for mechanically supporting the primary receiver element. The microstrip antenna further comprises a feeder electrically coupled between the planar antenna element and the primary receiver element for feeding an intercepted radio signal therebetween for down conversion by the primary receiver element, wherein the feeder is positioned such that the feeder passes through an aperture in the ground plane and in the dielectric material. The radio communication device also has a secondary receiver element coupled to the primary receiver element for demodulating the intercepted radio signal after down conversion by the primary receiver element.

Another aspect of the present invention is a selective call receiver comprising a microstrip antenna for intercepting a radio signal containing information, the microstrip antenna comprising a planar antenna element having first and second major surfaces. The microstrip antenna further comprises a ground plane coupled to the planar antenna element and having first and second major surfaces substantially parallel to the first and second major surfaces of the planar antenna element, and a dielectric material positioned between the second major surface of the planar antenna element and the first major surface of the ground plane for electrically insulating the planar antenna element from the ground plane. The microstrip antenna further comprises a primary receiver element mechanically coupled to the second major surface of the ground plane for mechanically supporting the primary receiver element, and a feeder electrically coupled between the planar antenna element and the primary receiver element for feeding the intercepted radio signal therebetween for down conversion by the primary receiver element, wherein the feeder is positioned such that the feeder passes through an aperture in the ground plane and in the dielectric material. The selective call receiver further comprises a secondary receiver element coupled to the primary receiver element for demodulating the intercepted radio signal after down conversion by the primary receiver element to derive the information. The selective call receiver further comprises a processor coupled to the secondary receiver element for processing the information and a display coupled to the processor for displaying the information.

DESCRIPTION OF THE PREFERRED EMBODIMENT

Figure 1:
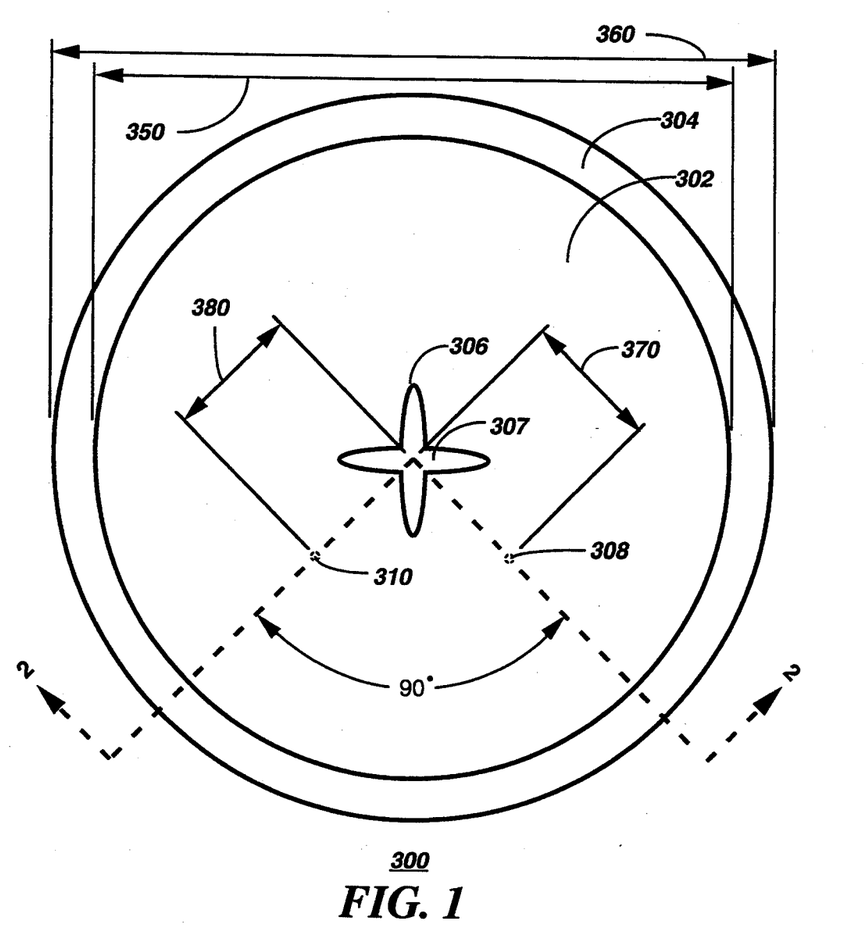
FIG. 1 is an orthographic top view of a microstrip antenna in accordance with the preferred embodiment of the present invention.
Figure 2:
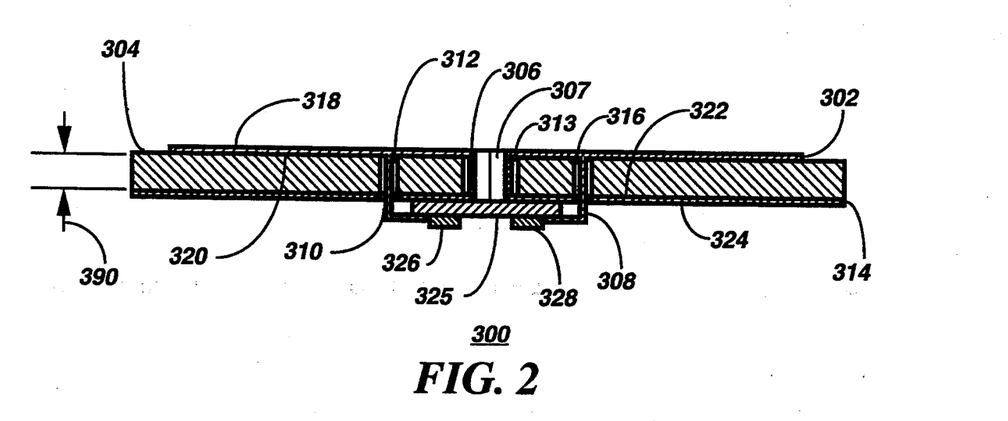
FIG. 2 is an orthographic cross-section view taken along the line 2—2 of FIG. 1 of the microstrip antenna in accordance with the preferred embodiment of the present invention.

Referring to FIGS. 1 and 2, an orthographic top view and an orthographic cross-section view taken along the line 2—2, respectively, of a microstrip antenna 300 in accordance with the preferred embodiment of the present invention depict a planar antenna element 302 having a first surface 318 and a second surface 320. Also shown are a ground plane 314 having a first surface 322 and a second surface 324, and a substrate 325 comprising primary receiver element circuits 326, 328. The ground plane 314 is insulated from the planar antenna element 302 by a dielectric material 304 positioned between the second surface 320 of the planar antenna element 302 and the first surface 322 of the ground plane 314. A conductive shorting element 306 extends through an aperture 313 in the dielectric material 304 between the planar antenna element 302 and the ground plane 314, the walls of the conductive shorting element 306 forming an aperture 307 extending between the first surface 318 of the planar antenna element 302 and the second surface 324 of the ground plane 314. As is explained herein below, the aperture 307 is useful for passing wiring between the substrate 325 and other components (not shown) proximate the first surface 318 of the planar antenna element, such as a display. Alternatively, the aperture 307 can be made to extend through the substrate 325 for passing wiring completely through the microstrip antenna 300. The microstrip antenna 300 as constructed with the shorting element 306 in the center of the antenna is a half-wave E-field antenna. This type of antenna is advantageous for applications operating at extremely high frequencies, e.g., 1.62 GHz, or requiring an antenna responsive to circular E-field polarization.

First and second feeders 308, 310 extend from the second surface 320 of the planar antenna element 302 through apertures 316, 312, respectively, in the dielectric material 304 and in the ground plane 314, and thence to the primary receiver element circuits 328, 326. The first and second feeders 308, 310 are present to electrically couple signals intercepted by the planar antenna element 302 with the primary receiver element circuits 328, 326. The primary receiver element circuits 328, 326 preferably comprise a conventional radio frequency (RF) amplifier, a local oscillator, a mixer, and associated filters to provide a first down conversion receiver function in a manner well-known to one of ordinary skill in the art. Positioning the primary receiver element circuits 328, 326 proximate the second surface 324 of the ground plane 314 near the first and second feeders 308, 310 advantageously minimizes signal losses between the planar antenna element 302 and the primary receiver element circuits 328, 326.

The material used in constructing the ground plane 314, the conductive shorting element 306, the planar antenna element 302, and the first and second feeders 308, 310 is preferably copper, plated with silver or gold, although it will be appreciated that other conductive materials such as beryllium-copper can be utilized as well. The dielectric material 304 is preferably Alumina ceramic formulated to have a dielectric constant between 8.0 and 11.0. The substrate 325 is a conventional printed circuit board material, such as FR4 glass filled epoxy. Other materials with similar properties may be substituted without departing from the intent of the present invention.

Dimensions of the microstrip antenna 300 are determined from the desired natural resonant frequency. For a natural resonant frequency of 1.62 GHz, for example, using a dielectric thickness 390 of 0.08 inch (0.20 cm) of Alumina ceramic, the antenna element diameter 350 is 1.34 inch (3.41 cm). The ground plane diameter 360 should be larger than the antenna element diameter 350 by an amount equal to or greater than four times the dielectric thickness 390, so a good choice for the ground plane diameter 360 is 1.70 inch (4.32 cm). For a feeder impedance of 50 ohms, the center-to-feeder distances 370, 380 are each 0.13 inch (0.34 cm).

Figure 3:
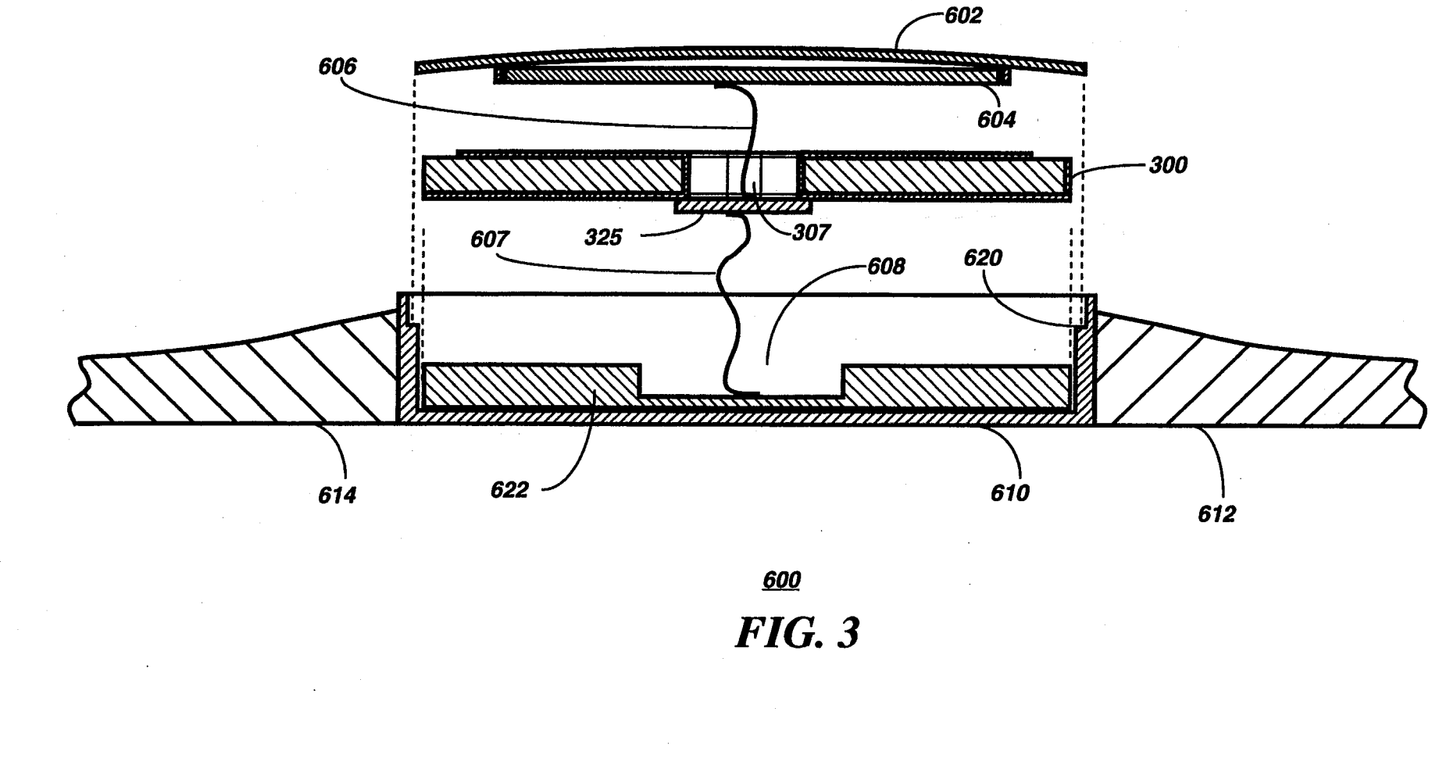
FIG. 3 is an orthographic cross-section view taken along a lengthwise centerline of a wrist-worn selective call receiver in accordance with the preferred embodiment of the present invention.

Referring to FIG. 3, an orthographic cross-section view taken along a lengthwise centerline of a wrist-worn selective call receiver 600 in accordance with the preferred embodiment of the present invention depicts how the microstrip antenna 300 mates with other components of the wrist-worn selective call receiver 600. A clear bezel 602 is mechanically coupled to a display 604, such as a liquid crystal display, and the resultant assembly is supported by a shoulder 620 of housing 610. A first flexible cable 606 passes through the aperture 307 and couples signals and power between the display 604 and the substrate 325. A second flexible cable 607 couples signals and power between the substrate 325 and remaining selective call receiver circuits 622. It will be appreciated that the first flexible cable 606 alternatively could be connected directly between the display 604 and the remaining selective call receiver circuits 622.

Portions of two wrist band elements 612, 614 are mechanically coupled to the housing 610 for fastening the selective call receiver 600 about a user's wrist. Preferably, the shape of the housing 610 is cylindrical, thus advantageously accommodating the circular geometry of the microstrip antenna 300 with minimum wasted space inside the housing 610, although it will be appreciated that a square, rectangular, or oval shape can be utilized as well for both the housing and the antenna.

Figure 4:
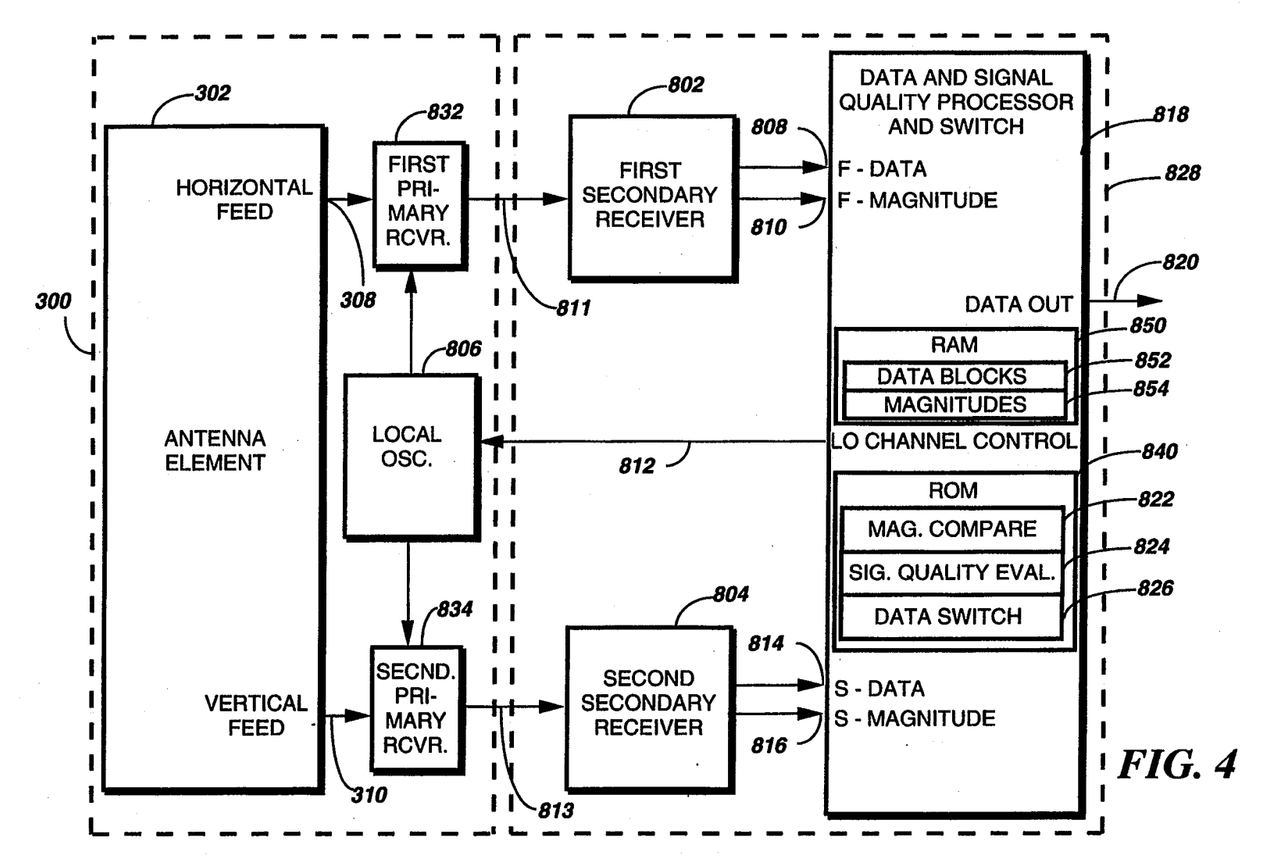
FIG. 4 is an electrical block diagram of the microstrip antenna with associated primary receiver circuitry and secondary receiver circuitry in accordance with the preferred embodiment of the present invention.

Referring to FIG. 4, an electrical block diagram of the microstrip antenna and associated primary receiver circuitry 300, and secondary receiver circuitry 828 in accordance with the preferred embodiment of the present invention depicts the antenna element 302 and the first and second feeders 308, 310, the first feeder 308 associated with horizontal E-field polarization and the second feeder 310 associated with vertical E-field polarization. That is to say, the first and second feeders 308, 310 are responsive to substantially orthogonal linear E-field polarizations. The first feeder 308 is coupled to a first primary receiver 832, while the second feeder 310 is coupled to a second primary receiver 834. The first and second primary receivers 832, 834 comprise a conventional RF amplifier, a mixer, and associated filters to provide a first down conversion receiver function in a manner well-known to one of ordinary skill in the art. A conventional local oscillator 806 is preferably included as part of the microstrip antenna 300, and is controlled by a local oscillator channel control line 812 from the secondary receiver circuitry 828. The local oscillator 806 is coupled to the mixer stage of the first and second primary receivers 832, 834 to provide the down conversion receiver function. Alternatively, the local oscillator 806 could be part of the secondary receiver circuitry 828 and an output signal from the local oscillator 806 could be coupled to the mixer stage of the first and second primary receivers 832, 834.

The first and second primary receivers 832, 834 develop first and second intermediate frequency (IF) output signals, which are coupled to first and second secondary IF receivers 802, 804 by IF input lines 811, 813. The first and second secondary IF receivers 802, 804 develop first and second data signals at first and second demodulated data outputs 808, 814 and first and second signal magnitude values at first and second received signal magnitude outputs 810, 816. The first and second data signals and the first and second signal magnitude values are coupled to a data and signal quality processor and switch 818. The data and signal quality processor and switch 818 stores in a random access memory (RAM) 850 values corresponding to first and second blocks of data 852 comprising the first and second data signals, along with the corresponding first and second signal magnitude values 854.

The data and signal quality processor and switch 818 employs signal quality evaluation firmware 824 stored in a read-only memory (ROM) 840 to scan the first and second blocks of data 852 for uncorrectable errors. Preferably, if one of the first and second blocks of data 852 has an uncorrectable error and the other of the first and second blocks of data 852 has no uncorrectable errors, then the data and signal quality processor and switch 818 employs its data switch firmware 826 to route an unerrored data block to a data output 820.

If, on the other hand, both the first and second blocks of data 852 contain uncorrectable errors, then the data and signal quality processor and switch 818 employs its magnitude compare firmware 822 to route each data bit comprising the first or second block of data 852 according to which data bit had the higher corresponding first or second signal magnitude value 854 at the time the data bit was received. In this manner the data and signal quality processor and switch 818 advantageously minimizes the probability of routing errored data bits to the data output 820.

Diversity reception using two feeders responsive to orthogonal E-field polarizations as described herein above can perform exceptionally well in satellite-based systems using low-Earth-orbit satellites. For such systems calculations show that as azimuth from a receiver to a satellite transmitter changes due to satellite orbital movement, combined direct and earth-reflected signals result in alternately strong orthogonal E-field polarizations. That is, when a signal momentarily has a strong component in a first polarization direction, the component in a second polarization direction orthogonal to the first typically will be weak, and vice versa. In addition, due to the large distance between the receiver and the satellite the alternations in stronger polarization direction tend to last for several seconds, thus requiring only modest speed in detecting an approaching need to switch to a different feeder having a stronger polarization response.

Figure 5:
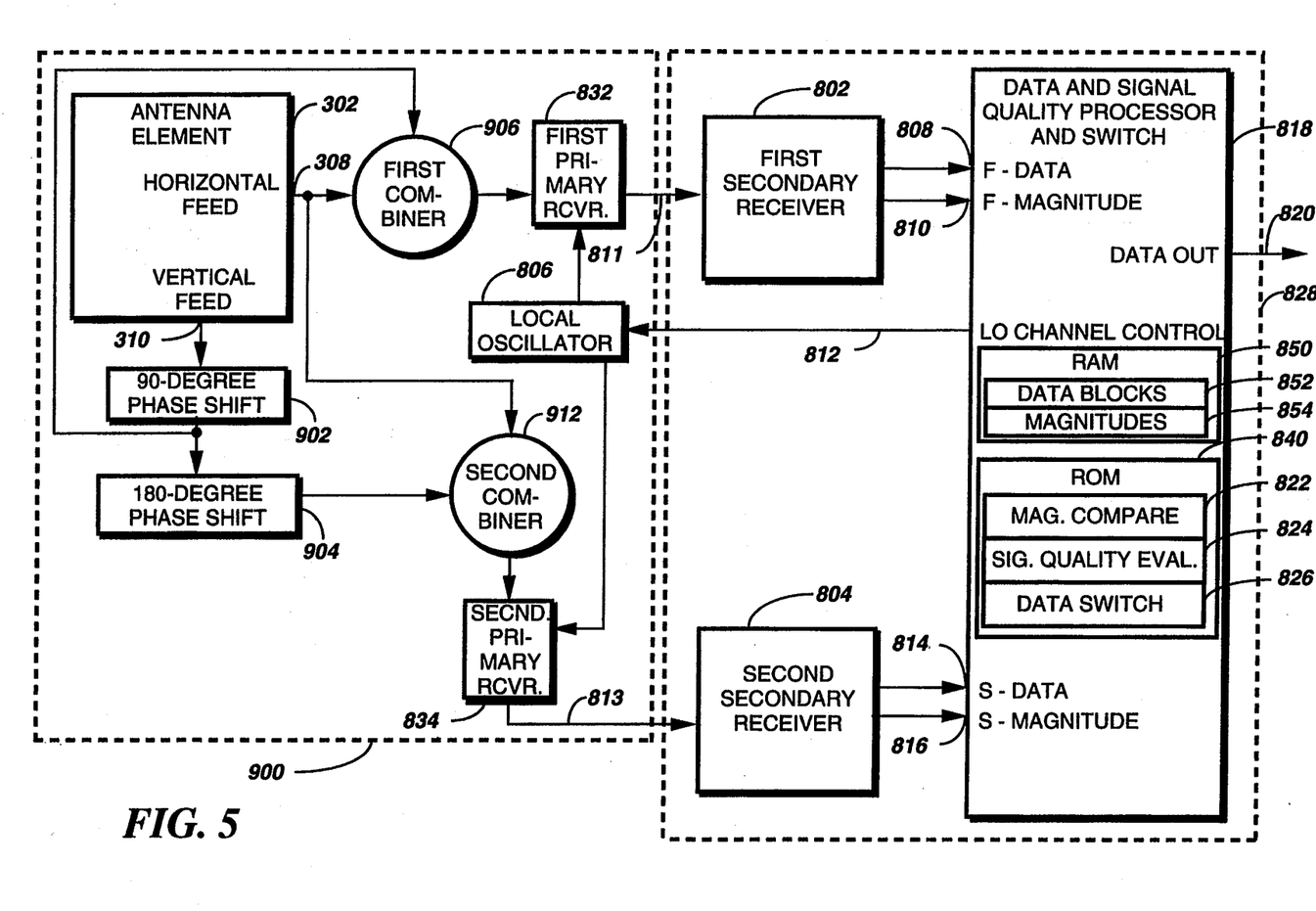
FIG. 5 is an electrical block diagram of a microstrip antenna with associated primary receiver circuitry and the secondary receiver circuitry in accordance with a first alternative embodiment of the present invention.

Referring to FIG. 5, an electrical block diagram of a microstrip antenna and associated primary receiver circuitry 900, and the secondary receiver circuitry 828 in accordance with a first alternative embodiment of the present invention is similar to the electrical block diagram of FIG. 4, the essential difference being the way in which the first (horizontally polarized) and second (vertically polarized) feeders 308, 310 of the antenna element 302 are coupled to the first and second primary receivers 832, 834. A first signal from the first feeder 308 is combined by a first combiner 906 with a second signal from the second feeder 310 after the phase of the second signal is shifted by ninety degrees in a ninety-degree phase shift element 902. The first combiner 906 produces a first combiner output signal, which is coupled to the first primary receiver 832. Because the first combiner 906 combines a horizontally polarized feed with a ninety-degree-phase-shifted vertically polarized feed, the first combiner output signal is responsive to a radio signal having an E-field circularly polarized in a first direction of rotation.

The first signal from the first feeder 308 is also combined by a second combiner 912 with the second signal from the second feeder 310 after the phase of the second signal is shifted by two-hundred-seventy degrees by the ninety-degree phase shift element 902 in tandem with a one-hundred-eighty-degree phase shift element 904. One of ordinary skill in the art will recognize that while the first combiner output signal is the sum of (the first signal) and (the second signal shifted by ninety degrees), the second combiner output signal is the difference of (the first signal) and (the second signal shifted by ninety degrees). The second combiner 912 produces a second combiner output signal, which is coupled to the second primary receiver 834. The second combiner output signal is responsive to a radio signal having an E-field circularly polarized in a second direction of rotation substantially orthogonal to the first direction of rotation associated with the first combiner output signal.

The secondary receiver circuitry 828 depicted in FIG. 5 functions similarly to the secondary receiver circuitry 828 depicted in FIG. 4, the essential difference being that the data and signal quality processor and switch 818 of FIG. 5 is comparing two signals having orthogonal circular polarizations instead of the orthogonal linear polarizations compared by the data and signal quality processor and switch 818 of FIG. 4. The first alternative embodiment of FIG. 5 is advantageous in systems having a circularly polarized transmitting antenna, e.g., a low-Earth-orbit satellite-based system.

Figure 6:
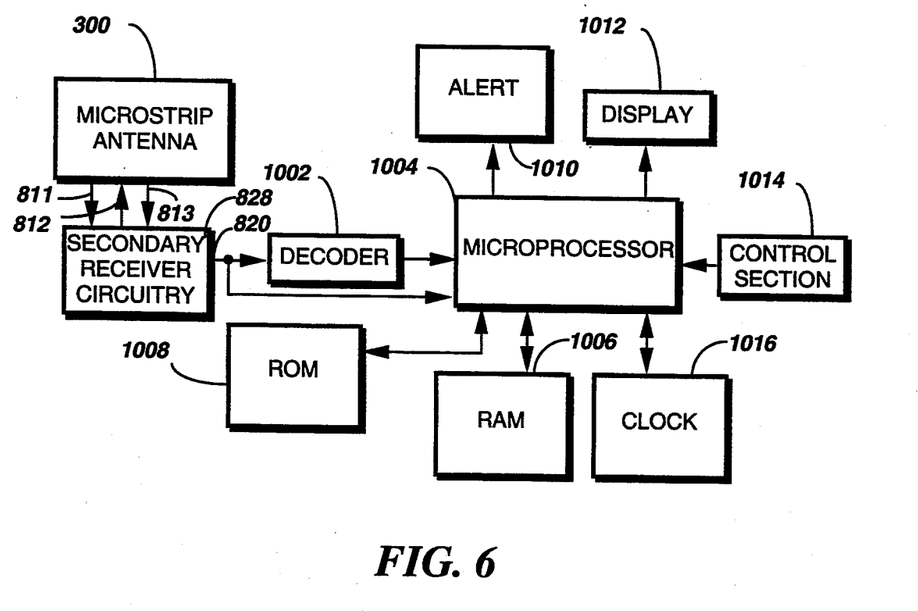
FIG. 6 is an electrical block diagram of a selective call receiver in accordance with the preferred embodiment of the present invention.

Referring to FIG. 6, an electrical block diagram of a selective call receiver in accordance with the preferred embodiment of the present invention comprises the microstrip antenna 300 coupled with the secondary receiver circuitry 828 by the IF input lines 811, 813 and the local oscillator channel control line 812. The data output 820 of the secondary receiver circuitry 828 is coupled to a decoder 1002 for decoding selective call addresses demodulated by the secondary receiver circuitry 828. The data output 820 is also coupled to a microprocessor 1004 for processing messages demodulated by the secondary receiver circuitry 828.

The microprocessor 1004 is coupled to a read-only memory (ROM) 1008 for storing executable firmware and predetermined initialization values, and to a random access memory (RAM) 1006 for storing messages received. An alert device 1010 is coupled to the microprocessor 1004 for generating an alert in response to a received message. A control section 1014 is also coupled to the microprocessor 1004 to allow a user to control the operation of the selective call receiver in a manner well-known to one of ordinary skill in the art. A real-time clock 1016 is coupled to the microprocessor 1004 for providing a time keeping function. A display 1012, e.g., a liquid crystal display, is coupled to the microprocessor 1004 for displaying messages received from the secondary receiver circuitry 828 and for displaying time of day information provided by the real-time clock 1016. The decoder 1002, the microprocessor 1004, the ROM 1008, the RAM 1006, the alert device 1010, the control section 1014, the display 1012, and the real-time clock 1016 are conventional. Functional equivalents of these blocks are available today in "The Wrist Watch Pager" manufactured by Motorola, Inc. of Schaumburg, Ill.

Figure 7:
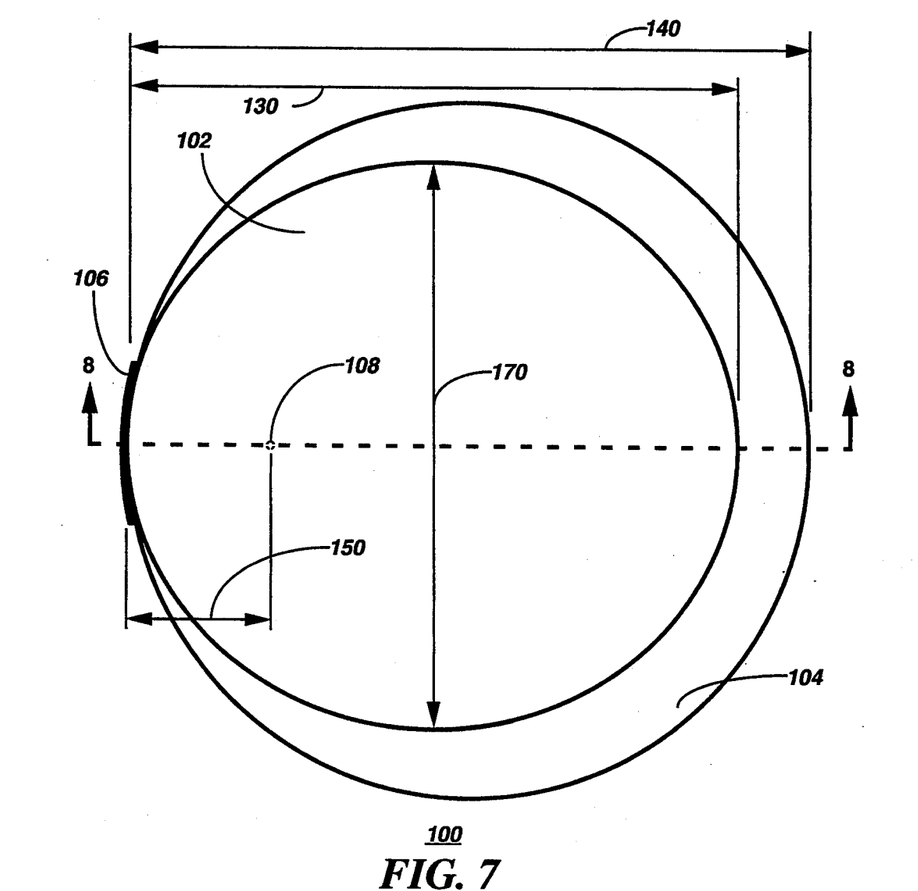
FIG. 7 is an orthographic top view of a microstrip antenna in accordance with a second alternative embodiment of the present invention.
Figure 8:
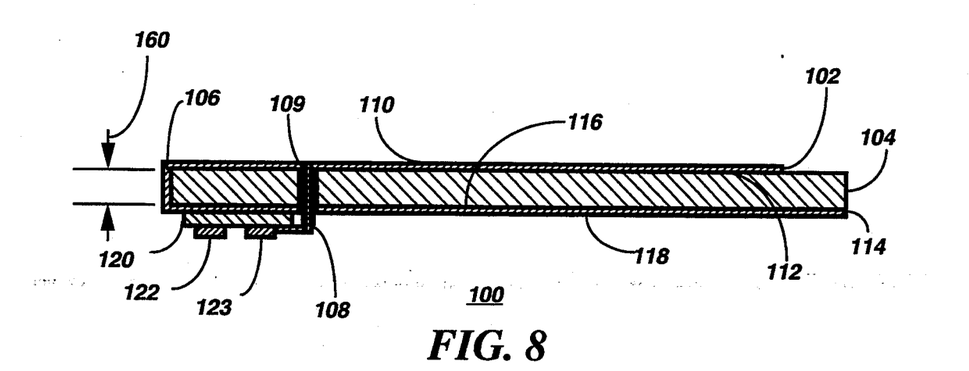
FIG. 8 is an orthographic cross-section view taken along the line 8—8 of FIG. 7 of the microstrip antenna in accordance with the second alternative embodiment of the present invention.

Referring to FIGS. 7 and 8, an orthographic top view and an orthographic cross-section view taken along the line 8—8 of a microstrip antenna 100 in accordance with a second alternative embodiment of the present invention depict an antenna element 102 having a first surface 110 and a second surface 112. Also shown are a ground plane 114 having a first surface 116 and a second surface 118, and a substrate 120 comprising primary receiver element circuits 122, 123, the substrate 120 being mechanically coupled to the second surface 118 of the ground plane 114. The ground plane 114 is insulated from the planar antenna element 102 by a dielectric material 104 positioned between the second surface 112 of the planar antenna element 102 and the first surface 116 of the ground plane 114. A conductive shorting element 106 extends along a portion of an edge of the microstrip antenna 100 between the planar antenna element 102 and the ground plane 114. The microstrip antenna 100 as constructed with the shorting element 106 at the edge of the antenna is a quarter-wave E-field antenna. The quarter-wave antenna is approximately one-half the diameter of a comparable half-wave (center shorted) microstrip antenna. The quarter-wave antenna thus is advantageous for lower frequency, e.g., UHF, applications requiring a micro-miniature antenna.

A feeder 108 extends from the second surface 112 of the planar antenna element 102 through an aperture 109 in the dielectric material 104 and in the ground plane 114, and thence to the primary receiver element circuits 122, 123. The feeder 108 is present to electrically couple a signal intercepted by the planar antenna element 102 with the primary receiver element circuits 122, 123. The primary receiver element circuits 122, 123 preferably comprise a conventional radio frequency (RF) amplifier, a local oscillator, a mixer, and a filter, well-known to one of ordinary skill in the art. Positioning the primary receiver element circuits 122, 123 proximate the second surface 118 of the ground plane 114 advantageously minimizes signal losses between the planar antenna element 102 and the primary receiver element circuits 122, 123.

The material used in constructing the ground plane 114, the conductive shorting element 106, the planar antenna element 102, and the feeder 108 is preferably copper, plated with silver or gold, although other conductive materials can be utilized as well. The dielectric material 104 is preferably Alumina ceramic formulated to achieve a dielectric constant between 8.0 and 11.0. The substrate 120 is a conventional printed wiring board material, such as FR4 glass filled epoxy. Other materials with similar properties may be substituted without departing from the intent of the present invention.

Dimensions of the microstrip antenna 100 are determined from the desired natural resonant frequency. For a natural resonant frequency of 930 MHz, for example, using a dielectric thickness 160 of 0.10 inch (0.25 cm) of Alumina ceramic, the antenna element major diameter 130 is 0.90 inch (2.29 cm). The antenna element minor diameter 170 is 0.70 inch (1.78 cm). For this type of antenna the ground plane circular diameter 140 should be larger than the antenna element major diameter 130 by an amount of at least two times the dielectric thickness 160, so a good choice for the ground plane circular diameter 140 is 1.1 inch (2.79 cm). For a feeder impedance of 50 ohms, the shorting-element-to-feeder distance 150 is 0.14 inch (0.36 cm).

Figure 9:
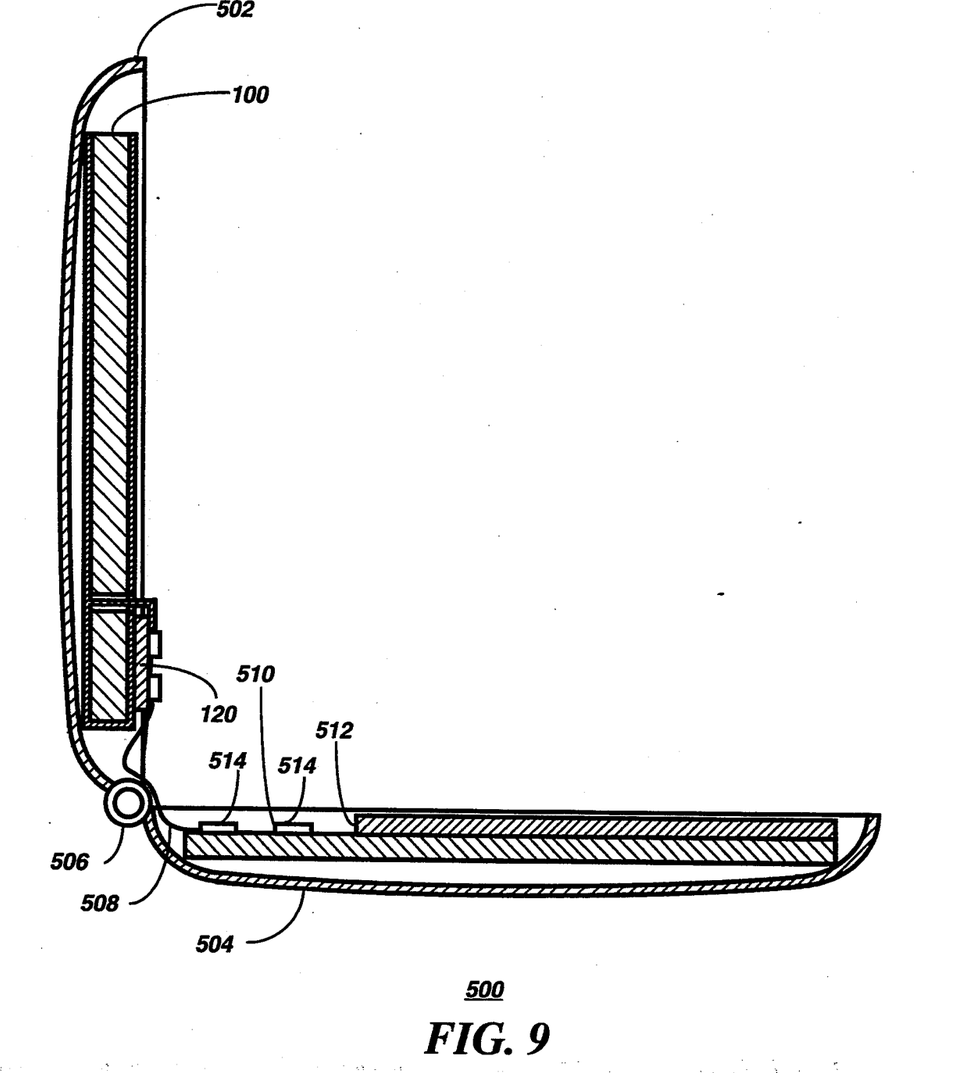
FIG. 9 is an orthographic cross-section side view of a selective call receiver in accordance with the second alternative embodiment of the present invention.

Referring to FIG. 9, an orthographic cross-section side view of a selective call receiver 500 in accordance with the second alternative embodiment of the present invention depicts the microstrip antenna 100 mounted within a first housing section 502. The first housing section is attached to a second housing section 504 by a hinge 506 that allows the first housing section to rotate about a side of the second housing section 504, similar to the cover of a typical pocket watch. The second housing section 504 encloses a display 512, e.g., a liquid crystal display, and other selective call receiver circuitry 510, e.g., secondary receiver elements 514, a processor, and a clock circuit. The other selective call receiver circuitry 510 and the substrate 120 are electrically coupled by a flexible cable 508 for transporting signals and power between the other selective call receiver circuitry 510 and the substrate 120. While the microstrip antenna 100 lends itself especially well to the mechanical housing configuration of FIG. 9, one of ordinary skill in the art will recognize that the microstrip antenna 300 (FIGS. 1 and 2) in accordance with the preferred embodiment of the present invention may also be used in a housing configuration similar to that of FIG. 9 after making slight dimensional modifications to the first and second housing sections 502, 504. The first and second housing sections 502, 504 are preferably manufactured by a molding process using a thermoset or other such plastic material.

Figure 10:
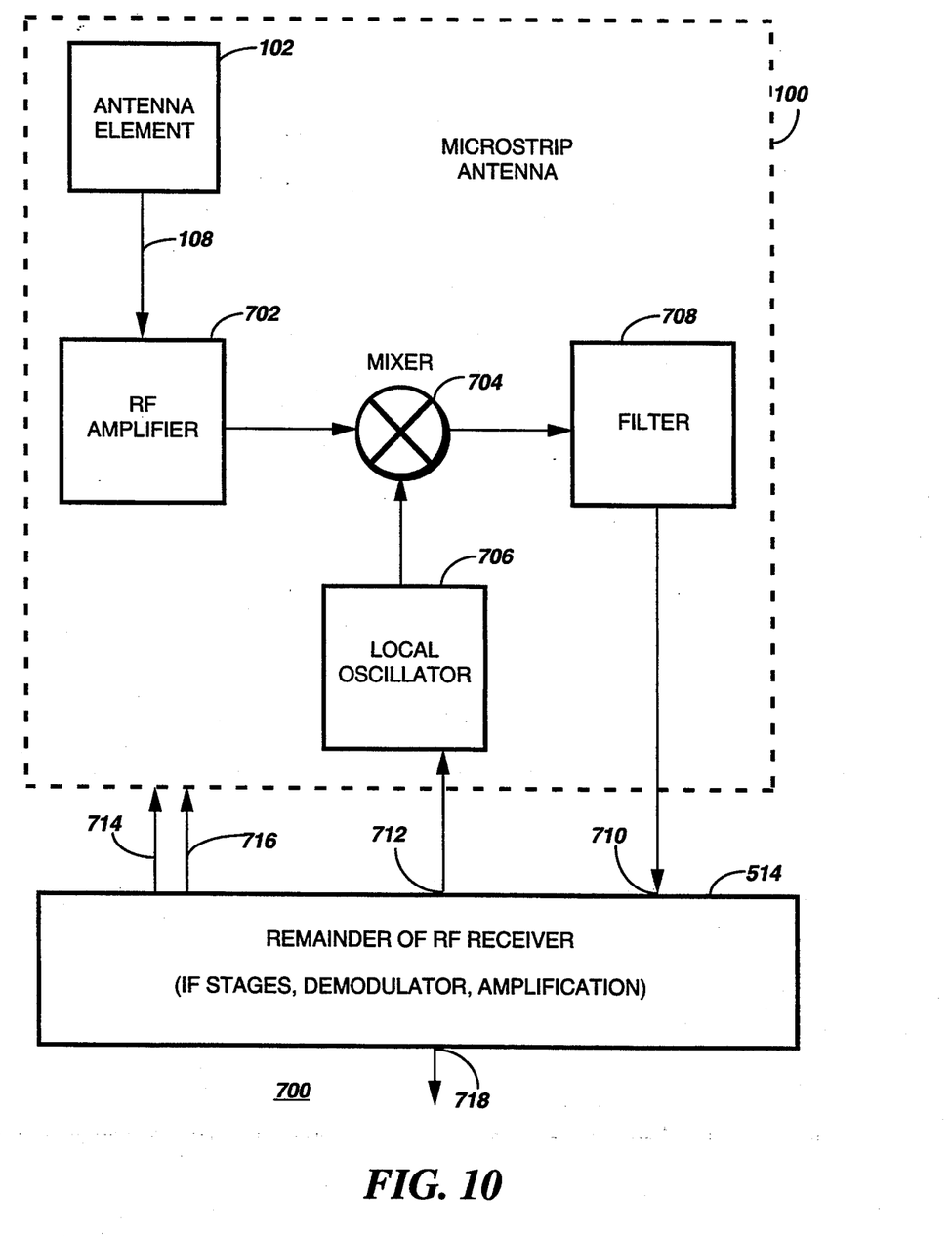
FIG. 10 is an electrical block diagram of the microstrip antenna with associated primary receiver circuitry and secondary receiver circuitry in accordance with the second alternative embodiment of the present invention.

Referring to FIG. 10, an electrical block diagram of the microstrip antenna and associated primary receiver circuitry 700, and secondary receiver elements 514 in accordance with the second alternative embodiment of the present invention comprises the antenna element 102 coupled by the feeder 108 to an RF amplifier 702 for amplifying an RF signal intercepted by the antenna element 102. The RF amplifier 702 is coupled to a mixer 704, which mixes the RF signal with a signal from a local oscillator 706 to produce an intermediate frequency (IF) signal that is then filtered by an IF filter 708 before reaching an IF input 710 of the secondary receiver elements 514. The secondary receiver elements 514 supply power to the microstrip antenna 100 by power supply lines 714, 716. The secondary receiver elements 514 also control channel selection by a local oscillator channel control line 712. Data derived from the RF signal is available at a data output 718 for processing by other parts of the selective call receiver 500 (FIG. 9) similar to the processing described herein above for the selective call receiver electrical block diagram of FIG. 6.

Thus, the present invention provides a micro-miniature antenna that performs well at UHF and higher frequencies. The antenna is able to fit comfortably within a wrist watch-size housing. The shape of the antenna advantageously can be made to conform to the geometry of the housing rather than forcing the housing to conform to a shape required by the antenna. Furthermore, the preferred embodiment of the antenna having two feeders responsive to orthogonal E-field polarizations provides significantly improved performance in the slowly changing multipath fading environment present in low-Earth-orbit satellite-based systems.

We claim:

1. A radio communication device comprising:
   a microstrip antenna comprising:
   a planar antenna element having first and second major surfaces;
   a ground plane coupled to and positioned apart from the planar antenna element to form a space therebetween, the ground plane having first and second major surfaces substantially parallel to the first and second major surfaces of the planar antenna element;
   a solid dielectric material positioned between and touching both the second major surface of the planar antenna element and the first major surface of the ground plane, wherein the dielectric material substantially fills the space between the ground plane and the antenna element;
   a primary receiver system mechanically coupled to the second major surface of the ground plane for mechanically supporting the primary receiver system; and
   a feeder system electrically coupled between the planar antenna element and the primary receiver system for feeding an intercepted radio signal therebetween for down conversion by the primary receiver system, wherein the feeder system is positioned such that the feeder system passes through at least one aperture in the ground plane and in the dielectric material; and
   a secondary receiver system coupled to the primary receiver system for demodulating the intercepted radio signal after down conversion by the primary receiver system.

2. The radio communication device in accordance with claim 1,
   wherein the microstrip antenna further comprises a geometry and dimensions that resonate the microstrip antenna at a predetermined resonant frequency having a corresponding wavelength value, and
   wherein the dielectric material has a thickness less than one-tenth the wavelength value, and
   wherein the microstrip antenna further comprises a conductive shorting element coupled between the ground plane and the planar antenna element and positioned substantially along a portion of an edge of the microstrip antenna, wherein the conductive shorting element comprises a length along the edge of the microstrip antenna, the length being at least twice the thickness of the dielectric material, and
   wherein the feeder system comprises a single feeder coupled to the planar antenna element at a coupling point along a line lying in a plane coplanar with the second major surface of the planar antenna element, the line being substantially perpendicular to and bisecting the length of the conductive shorting element, the line also passing through substantially the center of the second major surface of the planar antenna element.

3. The radio communication device in accordance with claim 1,
   wherein the microstrip antenna further comprises a conductive shorting element coupled between the ground plane and the planar antenna element and positioned proximate the center of the second major surface of the planar antenna element and the center of the first major surface of the ground plane, and
   wherein the feeder system comprises a single feeder coupled to the planar antenna element at a coupling point on the second major surface of the planar antenna element, the coupling point being positioned at a location different from the center of the second major surface of the planar antenna element.

4. The radio communication device in accordance with claim 3, wherein the planar antenna element, the dielectric material, the ground plane, and the conductive shorting element are constructed and formed such that an aperture through a central portion of the microstrip antenna is provided, the conductive shorting element forming the walls of the aperture.

5. The radio communication device in accordance with claim 1, further comprising:
   a processor coupled to the secondary receiver system for processing received information;
   a display coupled to the processor for displaying the received information; and
   time keeping circuitry coupled to the display for providing a timepiece function, wherein the time keeping circuitry shares use of the display with the processor.

6. The radio communication device in accordance with claim 5, further comprising:
   a first housing; and
   a second housing mechanically and electrically coupled to the first housing,
   wherein the mechanical coupling comprises a hinge that allows the first housing to rotate away from the second housing while still maintaining mechanical coupling through the hinge, and
   wherein the electrical coupling comprises circuit conductors having mechanical flexibility to permit a user to rotate the first housing away from the second housing without encountering undue resistance, and
   wherein the first housing encloses and supports the microstrip antenna and the primary receiver system, and
   wherein the second housing encloses and supports the secondary receiver system, the time keeping circuitry, and the display.

7. The radio communication device in accordance with claim 1, further comprising a housing mechanically coupled to the microstrip antenna and to the secondary receiver system for enclosing and protecting the microstrip antenna and the secondary receiver system, wherein the microstrip antenna is formed with a major surface geometry that substantially conforms with major interior geometry of the housing.

8. The radio communication device in accordance with claim 7, wherein the housing has a geometry that is substantially a cylinder having a diameter substantially greater than its end-to-end length, and wherein the microstrip antenna is formed with a substantially circular major surface geometry.

9. The radio communication device in accordance with claim 1, wherein the microstrip antenna further comprises a conductive shorting element coupled between the ground plane and the planar antenna element and positioned proximate the center of the second major surface of the planar antenna element and the center of the first major surface of the ground plane, and wherein the feeder system comprises first and second feeders coupled to the planar antenna element at first and second coupling points, respectively, on the second major surface of the planar antenna element, the first and second coupling points being positioned at locations different from the center of the second major surface of the planar antenna element and different from each other, and wherein the primary receiver system comprises:
first and second primary receivers;
first and second combiners coupled to the first and second primary receivers for providing an input signal thereto; and
first and second phase shift circuits coupled to the first and second combiners and coupled to the first feeder for receiving a first radio signal therefrom, wherein the first phase-shift circuit shifts the phase of the first radio signal by a first phase shift amount and the second phase shift circuit shifts the phase of the first radio signal by a second phase shift amount, and wherein the first and second combiners are further coupled to the second feeder for receiving a second radio signal therefrom and are also coupled to one of the first and second phase shift circuits for generating first and second predetermined combinations of the first and second radio signals.

10. The radio communication device in accordance with claim 9, wherein a first radial axis of the second major surface of the planar antenna element through the first coupling point and a second radial axis of the second major surface of the planar antenna element through the second coupling point subtend an arc of substantially ninety degrees.

11. The radio communication device in accordance with claim 9, wherein the absolute value of the difference between the first and second phase shift amounts is substantially ninety degrees.

12. The radio communication device in accordance with claim 1, wherein the microstrip antenna further comprises a conductive shorting element coupled between the ground plane and the planar antenna element and positioned proximate the center of the second major surface of the planar antenna element and the center of the first major surface of the ground plane, and wherein the feeder system comprises first and second feeders coupled to the planar antenna element at first and second coupling points, respectively, on the second major surface of the planar antenna element, the first and second coupling points being positioned at locations different from the center of the second major surface of the planar antenna element and different from each other, and wherein the primary receiver system comprises first and second primary receivers, and wherein the first and second feeders are coupled to the first and second primary receivers, respectively, for receiving first and second radio signals fed from the first and second feeders.

13. The radio communication device in accordance with claim 9, wherein the secondary receiver system comprises:

first and second secondary receivers coupled to the first and second primary receivers for receiving the first and second predetermined combinations of the first and second radio signals therefrom after down conversion thereby; and switching means coupled to the first and second secondary receivers for switching between the first and second predetermined combinations of the first and second radio signals.

14. The radio communication device in accordance with claim 12, wherein the secondary receiver system comprises:

first and second secondary receivers coupled to the first and second primary receivers for receiving the first and second radio signals therefrom after down conversion thereby; and switching means coupled to the first and second secondary receivers for switching between the first radio signal and the second radio signal.

15. The radio communication device in accordance with claim 13, wherein the absolute value of the difference between the first and second phase shift amounts is substantially ninety degrees, and wherein the first predetermined combination comprises the sum of the first and second radio signals, and wherein the second predetermined combination comprises the difference between the first and second radio signals.

16. The radio communication device in accordance with claim 13, further comprising:

signal quality measurement means within the secondary receiver system for measuring signal quality of the first and second radio signals; and processor means coupled to the signal quality measurement means and to the switching means for controlling the switching means in response to the measured signal quality.

17. A selective call receiver comprising:

a microstrip antenna for intercepting a radio signal comprising information, the microstrip antenna comprising:

a planar antenna element having first and second major surfaces;

a ground plane coupled to and positioned apart from the planar antenna element to form a space therebetween, the ground plane having first and second major surfaces substantially parallel to the first and second major surfaces of the planar antenna element;

a solid dielectric material positioned between and touching both the second major surface of the planar antenna element and the first major surface of the ground plane, wherein the dielectric material substantially fills the space between the ground plane and the antenna element;

a primary receiver system mechanically coupled to the second major surface of the ground plane for mechanically supporting the primary receiver system; and a feeder system electrically coupled between the planar antenna element and the primary receiver system for feeding the intercepted radio signal therebetween for down conversion by the primary receiver system, wherein the feeder system is positioned such that the feeder system passes through at least one aperture in the ground plane and in the dielectric material;

a secondary receiver system coupled to the primary receiver system for demodulating the intercepted radio signal after down conversion by the primary receiver system to derive the information;

a processor coupled to the secondary receiver system for processing the information; and a display coupled to the processor for displaying the information.

18. The selective call receiver in accordance with claim 17, wherein the microstrip antenna further comprises a conductive shorting element coupled between the ground plane and the planar antenna element and positioned proximate the center of the second major surface of the planar antenna element and the center of the first major surface of the ground plane, and wherein the feeder system comprises first and second feeders coupled to the planar antenna element at first and second coupling points, respectively, on the second major surface of the planar antenna element, the first and second coupling points being positioned at locations different from the center of the second major surface of the planar antenna element and different from each other, and wherein the primary receiver system comprises:
first and second primary receivers;
first and second combiners coupled to the first and second primary receivers for providing an input signal thereto; and
first and second phase shift circuits coupled to the first and second combiners and coupled to the first feeder for receiving a first radio signal therefrom, wherein the first phase-shift circuit shifts the phase of the first radio signal by a first phase shift amount and the second phase shift circuit shifts the phase of the first radio signal by a second phase shift amount, and wherein the first and second combiners are further coupled to the second feeder for receiving a second radio signal therefrom and are also coupled to one of the first and second phase shift circuits for generating first and second predetermined combinations of the first and second radio signals.

19. The selective call receiver in accordance with claim 18, further comprising a switch element coupled to the first and second combiners for switching between the first and second predetermined combinations of the first and second radio signals, wherein a first radial axis of the second major surface of the planar antenna element through the first coupling point and a second radial axis of the second major surface of the planar antenna element through the second coupling point subtend an arc of substantially ninety degrees, and wherein the absolute value of the difference between the first and second phase shift amounts is substantially ninety degrees, and wherein the first predetermined combination comprises the sum of the first and second radio signals, and wherein the second predetermined combination comprises the difference between the first and second radio signals.

20. The selective call receiver in accordance with claim 19, further comprising:

a signal quality measurement element within the secondary receiver system for measuring signal quality of the first and second radio signals; and a controller coupled to the signal quality measurement element and to the switch element for controlling the switch element in response to the measured signal quality.

21. A radio communication device comprising:
a microstrip antenna comprising:
a planar antenna element having first and second major surfaces;
a ground plane coupled to the planar antenna element and having first and second major surfaces substantially parallel to the first and second major surfaces of the planar antenna element;
a dielectric material positioned between the second major surface of the planar antenna element and the first major surface of the ground plane for electrically insulating the planar antenna element from the ground plane;
a primary receiver system mechanically coupled to the second major surface of the ground plane for mechanically supporting the primary receiver system; and
a feeder system electrically coupled between the planar antenna element and the primary receiver system for feeding an intercepted radio signal therebetween for down conversion by the primary receiver system, wherein the feeder system is positioned such that the feeder system passes through at least one aperture in the ground plane and in the dielectric material; and
a secondary receiver system coupled to the primary receiver system for demodulating the intercepted radio signal after down conversion by the primary receiver system,
wherein the microstrip antenna further comprises a conductive shorting element coupled between the ground plane and the planar antenna element and positioned proximate the center of the second major surface of the planar antenna element and the center of the first major surface of the ground plane, and
wherein the feeder system comprises first and second feeders coupled to the planar antenna element at first and second coupling points, respectively, on the second major surface of the planar antenna element, the first and second coupling points being positioned at locations different from the center of the second major surface of the planar antenna element and different from each other, and
wherein the primary receiver system comprises:
first and second primary receivers;
first and second combiners coupled to the first and second primary receivers for providing an input signal thereto; and first and second phase shift circuits coupled to the first and second combiners and coupled to the first feeder for receiving a first radio signal therefrom, wherein the first phase-shift circuit shifts the phase of the first radio signal by a first phase shift amount and the second phase shift circuit shifts the phase of the first radio signal by a second phase shift amount, and wherein the first and second combiners are further coupled to the second feeder for receiving a second radio signal therefrom and are also coupled to one of the first and second phase shift circuits for generating first and second predetermined combinations of the first and second radio signals, and wherein the secondary receiver system comprises:
first and second secondary receivers coupled to the first and second primary receivers for receiving the first and second predetermined combinations of the first and second radio signals therefrom after down conversion thereby; and switching means coupled to the first and second secondary receivers for switching between the first and second predetermined combinations of the first and second radio signals, wherein the absolute value of the difference between the first and second phase shift amounts is substantially ninety degrees, and wherein the first predetermined combination comprises the sum of the first and second radio signals, and wherein the second predetermined combination comprises the difference between the first and second radio signals.

* * * * *